United States Patent
Aziz et al.

(10) Patent No.: US 7,982,491 B2
(45) Date of Patent: Jul. 19, 2011

(54) ACTIVE TERMINATION AND SWITCHABLE PASSIVE TERMINATION CIRCUITS

(75) Inventors: Joseph Aziz, Irvine, CA (US); Andrew Chen, Redondo Beach, CA (US); Derek Tam, Irvine, CA (US); Ark-Chew Wong, Irvine, CA (US); Agnes Neves Woo, Encino, CA (US); Marcel Lugthart, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/384,793

(22) Filed: Apr. 8, 2009

(65) Prior Publication Data
US 2010/0259340 A1 Oct. 14, 2010

(51) Int. Cl.
*H03K 17/16* (2006.01)
*H03K 19/003* (2006.01)
(52) U.S. Cl. ............................ 326/30; 326/34; 326/86
(58) Field of Classification Search .................. None
See application file for complete search history.

(56) References Cited

U.S. PATENT DOCUMENTS

| | | | |
|---|---|---|---|
| 6,107,867 A * | 8/2000 | Lakshmikumar | 327/543 |
| 6,343,024 B1 * | 1/2002 | Zabroda | 363/22 |
| 2008/0150650 A1 * | 6/2008 | Rentala et al. | 333/32 |

* cited by examiner

*Primary Examiner* — Anh Q Tran
(74) *Attorney, Agent, or Firm* — Farjami & Farjami LLP

(57) ABSTRACT

According to one exemplary embodiment, an active termination circuit includes at least one active termination branch, where the at least one active termination branch includes at least one transistor for providing an active termination output. The at least one active termination branch further includes an amplifier driving the at least one transistor, where the amplifier has a non-inverting input coupled to the active termination output via a feedback network. The amplifier controls a current flowing through the at least one transistor so as to provide the active termination output. The active termination output can be provided at a drain of the at least one transistor, where a source of the at least one transistor is coupled to ground through a degeneration transistor and a tail current sink.

18 Claims, 4 Drawing Sheets

US 7,982,491 B2

ACTIVE TERMINATION AND SWITCHABLE PASSIVE TERMINATION CIRCUITS

BACKGROUND OF THE INVENTION

1. Field of the Invention

The present invention is generally in the field of electrical circuits. More particularly, the invention is in the field of transmission line termination circuits.

2. Background Art

Transmitter modules, which can include line drivers, can be utilized in set-top boxes, cable modems, routers, computer interfaces, and other electronic devices to drive transmission lines, such as Ethernet transmission lines. For example, a transmitter module including a line driver can be utilized in an Ethernet interface in a computer. To prevent return loss and signal distortion, for example, a transmitter module or a line driver in the transmitter module is typically required to provide an output impedance that matches the characteristic impedance of the transmission line. For example, a line driver in an Ethernet application can be required to provide a 50.0 ohm output impedance to drive a 50.0 ohm load via a 50.0 ohm Ethernet cable coupled to an Ethernet port. Conventionally, a transmitter module can be passively terminated by utilizing one or more termination resistors to provide a required output impedance. However, the conventional approach to providing a termination resistance for transmitter modules or line drivers in the transmitter modules can have undesirably consequences.

Conventionally, for example, a line driver, such as a current-based line driver, with differential outputs in a transmitter module can be passively terminated by utilizing two termination resistors coupled across the positive and negative outputs of the line driver. In an Ethernet application, for example, each of the termination resistors can have a resistance of approximately 50.0 ohms to provide approximately 100.0 ohms across the differential positive and negative outputs of the line driver. However, when the line driver is transmitting data over a transmission line, a large amount of the current generated by the line driver can flow through the termination resistors and remain on-chip, thereby undesirably increasing on-chip current consumption. As a result, heat generated by the current flowing through the termination resistors can increase packaging cost required to handle the additional heat. Also, the line driver can require a larger layout area to handle the additional current required, which can undesirably increase manufacturing cost.

SUMMARY OF THE INVENTION

Active termination and switchable passive termination circuits substantially as shown in and/or described in connection with at least one of the figures, and as set forth more completely in the claims.

DETAILED DESCRIPTION OF THE INVENTION

The present invention is directed to active termination and switchable passive termination circuits. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

Figure 1:
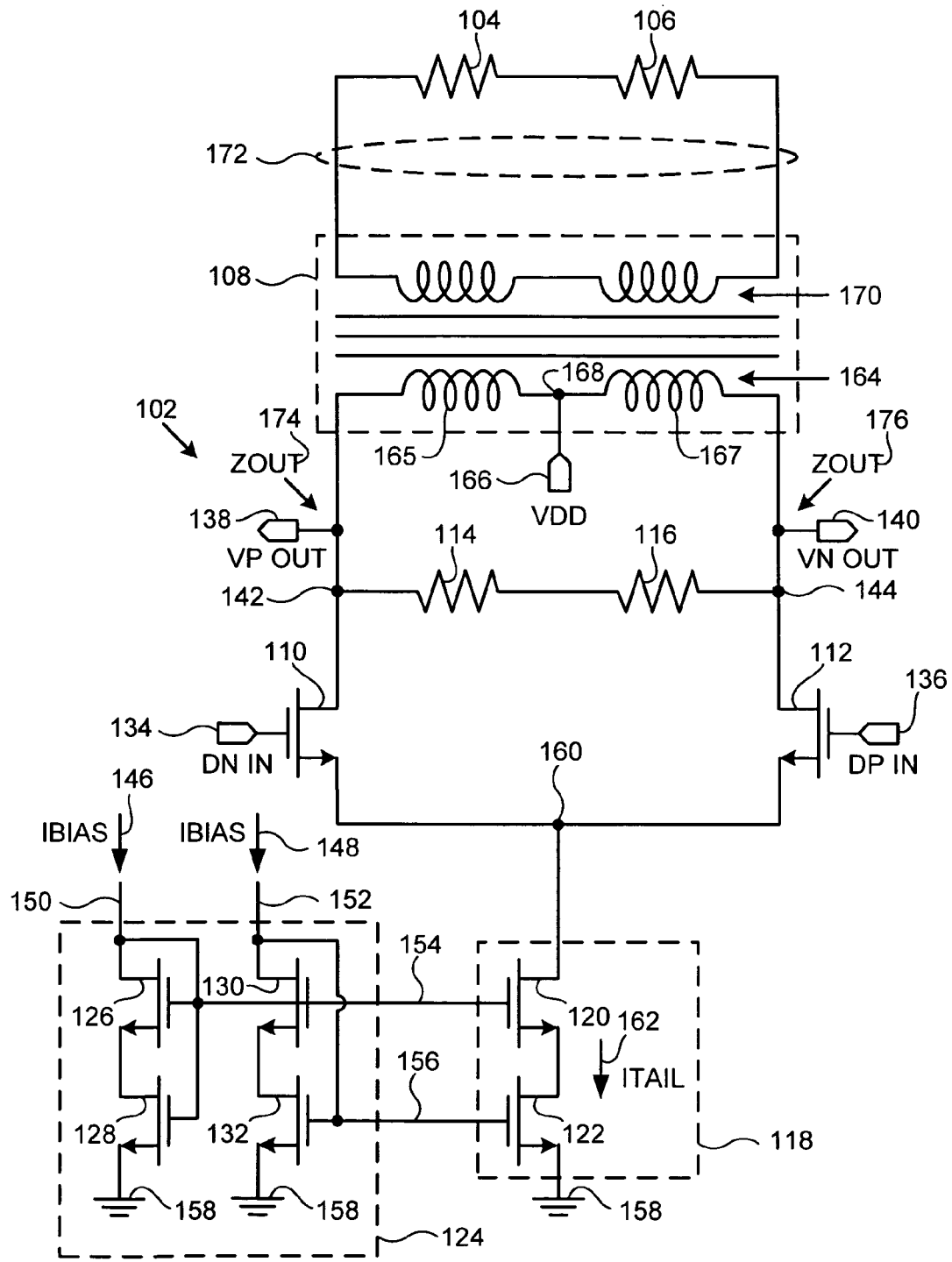
FIG. 1 illustrates a circuit diagram of an exemplary conventional line driver.

FIG. 1 shows a circuit diagram of an exemplary conventional line driver coupled to a pair of termination resistors. In FIG. 1, conventional line driver 102 is coupled to termination resistors 104 and 106 via transformer 108. Termination resistors 104 and 106 can represent, for example, an RJ45 Ethernet port in a receiver module. Conventional line driver 102, which can be a conventional current-based line driver, includes transistors 110 and 112, termination resistors 114 and 116, tail current sink 118, which includes transistors 120 and 122, and bias circuit 124, which includes transistors 126, 128, 130, and 132. Conventional line driver 102 can be utilized in set-top boxes, cable modems, routers, computers, and other electronic devices to drive transmission lines coupled to the devices. For example, conventional line drive 102 can be utilized in any IC chip with an Ethernet interface, where the Ethernet interface is coupled to a Ethernet transmission line, such as a category (CAT) 5 Ethernet cable. Conventional line driver 102 can be fabricated on a semiconductor die (also referred to as a "chip" or simply as a "die" in the present application).

Conventional line driver 102 can be configured to receive data negative input (DN IN) 134 and data positive input (DP IN) 136 and can provide voltage positive output (VP OUT) 138 and voltage negative output (VN OUT) 140, where VP OUT 138 and VN OUT 140 are differential outputs. DN IN 134 and DP IN 136 are digital inputs, where DN IN 134 is the complement of DP IN 136. Also, data can be inputted into conventional line driver 102 as a digital word comprising multiple bits, where each bit and its complement can be inputted into respective transistors, such as transistors 112 and 110, which are coupled to a tail current sink, such as tail current sink 118. Thus, for a digital word comprising 16 bits, the configuration of transistors 112 and 110 and tail current sink 118 can be repeated 16 times, where the drain of each transistor (e.g. transistor 112) receiving a bit of the digital word can be coupled to node 144, the drain of each transistor (e.g. transistor 110) receiving a complementary bit of the digital word can be coupled to node 142, and each tail current sink, such as tail current sink 118, can be coupled to bias circuit 124.

As shown in FIG. 1, bias circuit 124 receives bias current (IBIAS) 146 and IBIAS 148 on respective lines 150 and 152 and provides bias voltages for respective transistors 120 and 122 on lines 154 and 156. Also shown in FIG. 1, transistors 126 and 128 are coupled in series between line 150 and ground 158 and transistors 130 and 132 are coupled in series between line 152 and ground 158, where transistors 126, 128, 130, and 132 can each be an N-channel field effect transistor (NFET). Further shown in FIG. 1, transistors 120 and 122, which can be NFETs, are coupled in series between ground 158 and node 160, at which the sources of transistors 110 and 112 are coupled. Transistors 120 and 122 in current tail sink 118 can draw tail current (ITAIL) 162 through transistors 110 and 112. ITAIL 162 can be determined by the bias voltages provided by bias circuit 124 on lines 154 and 156. For a 10 Base T (10BT) Ethernet data transmission standard, ITAIL 162 can be, for example, approximately 100.0 milliamperes (mA). For a 100TX Ethernet data transmission standard, ITAIL 162 can be, for example, approximately 40.0 mA.

Also shown in FIG. 1, the drains of transistors 110 and 112 are coupled to respective nodes 142 and 144, which provide VP OUT 138 and VN OUT 140, termination resistors 114 and 116 are coupled in series between nodes 142 and 144, and DN IN 134 and DP IN 136 are coupled to the respective gates of transistors 110 and 112, which can be NFETs. Termination resistors 114 and 116 can provide on-chip passive termination for conventional line driver 102 and can each have a resistance equal to, for example, approximately 50.0 ohms. Further shown in FIG. 1, primary winding 164 of transformer 108 is coupled across nodes 142 and 144, supply voltage 166 (i.e. VDD) is coupled to the center tap of primary winding 164 at node 168, and termination resistors 104 and 106 are coupled in series across secondary winding 170 of transformer 108 via transmission line 172, which can be an Ethernet transmission line. Termination resistors, which can each be equal to approximately 50.0 ohms, can represent, for example, an RJ45 Ethernet port in a receiver module. Primary winding 164 includes inductors 165 and 167, which provide VDD to respective nodes 142 and 144.

Conventional line driver 102 can provide output impedance ZOUT 174 at node 142 and ZOUT 176 at node 144 as required to match the characteristic impedance of the transmission line that the line driver is driving, such as transmission line 172. For example, ZOUT 174 and ZOUT 176 can each be equal to approximately 50.0 ohms. The output impedance of line driver 102 can be provided through on-chip passive termination provided by termination resistors 114 and 116, which are coupled between output nodes 142 and 144. Termination resistors 114 and 116 can provide an output impedance between differential outputs VP OUT 138 and VN OUT 140 at respective nodes 142 and 144 that can be equal to, for example, approximately 100.0 ohms.

However, when conventional line driver 102 is transmitting data over transmission line 172, a large amount of output current is shunted through (i.e. consumed by) termination resistors 114 and 116. For example, approximately 50.0 percent of the output current generated by conventional line driver 102 can be consumed by termination resistors 114 and 116. Thus, termination resistors 114 and 116 can significantly increase on-chip power consumption, which can require a more expensive package to handle the additional heat generated by the termination resistors. Also, to handle the additional current shunted through termination resistors 114 and 116, transistors 110 and 112 and tail current sink 118 each need to have a larger size, thereby increasing the layout area of conventional line driver 102 and, consequently, increasing manufacturing cost.

Figure 2:
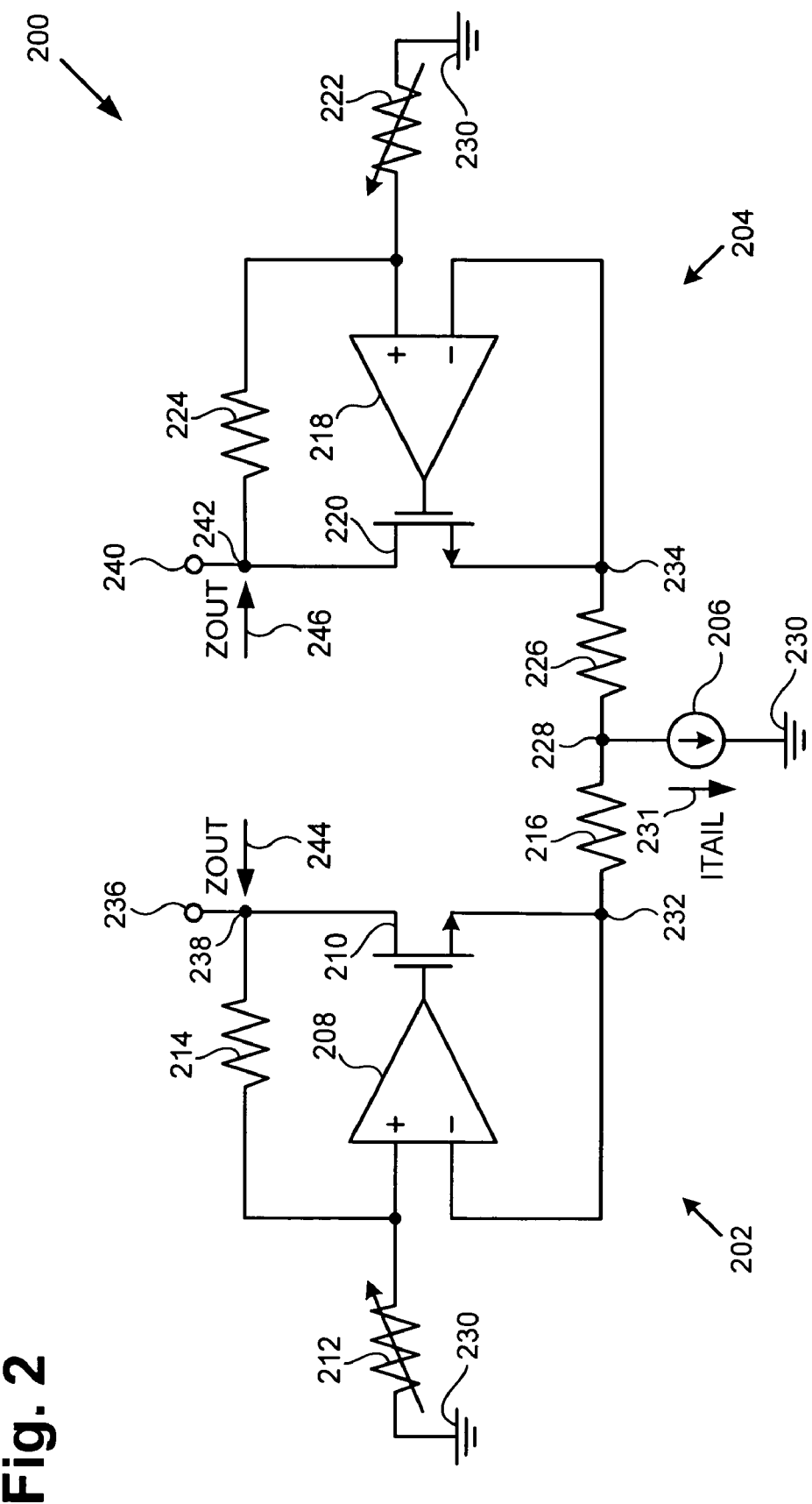
FIG. 2 illustrates a circuit diagram of an exemplary active termination circuit in accordance with one embodiment of the present invention.

FIG. 2 shows a circuit diagram of an exemplary differential active termination circuit in accordance with one embodiment of the present invention. Active termination circuit 202, which is a differential active termination circuit, includes active termination branches (also referred to simply as "branches") 202 and 204 and tail current sink 206. Branch 202 includes amplifier 208, transistor 210, feedback resistors 212 and 214, and degeneration resistor 216 and branch 204 includes amplifier 218, transistor 220, feedback resistors 222 and 224, and degeneration resistor 226. In one embodiment, each component in branch 202 is substantially identical to the corresponding component in branch 204. Thus, amplifier 208 in branch 202 is substantially identical to amplifier 218 in branch 204, transistor 210 in branch 202 is substantially identical to transistor 220 in branch 204, and so forth. Branch 202 is coupled to branch 204 at node 228 and tail current sink 206 is coupled between node 228 and ground 230.

As shown in FIG. 2, a first terminal of tail current sink 206 is coupled to ground 230 and a second terminal of tail current sink 206 is coupled to first terminals of degeneration resistors 216 and 226 at node 228. Degeneration resistors 216 and 226 can each have resistance equal to, for example, approximately 4.5 ohms in one embodiment. Tail current sink 206 sinks tail current (ITAIL) 231, which is substantially equal to the current flowing through transistors 210 and 220. For a 10BT Ethernet data transmission standard, ITAIL 231 can be, for example, approximately 55.0 mA. For a 100TX Ethernet data transmission standard, ITAIL 231 can be, for example, approximately 25.0 mA.

Also shown in FIG. 2, a second terminal of degeneration resistor 216 is coupled to the source of transistor 210 and the negative (inverting) input of amplifier 208 at node 232, and the second terminal of degeneration resistor 226 is coupled to the source of transistor 220 and the negative (inverting) input of amplifier 218 at node 234. Amplifiers 208 and 218 can each be an operational amplifier, such as a high gain operational amplifier. Transistors 210 and 220 can each be an NFET, for example. In one embodiment, more than one transistor can be utilized in place of each of transistors 210 and 220. Further shown in FIG. 2, a first terminal of feedback resistor 212 is coupled to ground 230 and a second terminal of feedback resistor 212 is coupled to a first terminal of feedback resistor 214 and the positive (non-inverting) input of amplifier 208.

Also shown in FIG. 2, a first terminal of feedback resistor 222 is coupled to ground 230 and a second terminal of feedback resistor 222 is coupled to a first terminal of feedback resistor 224 and the positive (non-inverting) input of amplifier 218. Feedback resistors 212 and 222 can each be an adjustable resistor and can have a resistance equal to, for example, approximately 1.0 kilo-ohm in one embodiment. Feedback resistors 214 and 224 can each have a resistance equal to, for example, at least 10.0 kilo-ohms. Further shown in FIG. 2, the output of amplifier 208 is coupled to the gate of transistor 210 and the drain of transistor 210 is coupled to a second terminal of feedback resistor 214 and output terminal 236 at node 238. Also shown in FIG. 2, the output of amplifier 218 is coupled to the gate of transistor 220 and the drain of transistor 220 is coupled to a second terminal of feedback resistor 224 and output terminal 240 at node 242.

The operation of branch 202 of active termination circuit 200 will now be discussed. Since branch 204 of active termination circuit 200 operates in a substantially similar manner as branch 202, the following discussion also applies to branch 204. In the following discussion, it is assumed that:

$$g_m \cdot R_{TERM} \gg 1.0 \qquad \text{equation (1)}$$

where "$g_m$" is the transconductance of transistor 210 and "$R_{TERM}$" is the resistance of degeneration resistor 216. As a result of the voltage divider comprising feedback resistors 212 and 214, $V_{(+)} = V_{(-)} = V_{238} \cdot R_1/(R_1+R_2)$, where "$V_{(+)}$" is the voltage at the positive terminal of amplifier 208, "$V_{(-)}$" is the voltage at the negative terminal of amplifier 208, "$V_{238}$" is the voltage at node 238 (i.e. at output terminal 236), "$R_1$" is the resistance of feedback resistor 212, and "$R_2$" is the resistance of feedback resistor 214. Also, the feedback network provided by feedback resistors 212 and 214 ensures that $V_{(+)}=V_{(-)}$.

Since the negative input of amplifier 208 has a high input impedance, it (i.e. the negative input of amplifier 208) draws a negligible amount of current. Therefore, $I_{RTERM}=V_{238}/R_{TERM}$, where "$I_{RTERM}$" is the current flowing through degeneration resistor 216. As a result, output impedance (ZOUT) at node 238, which is indicated by arrow 244, can be represented by the equation:

$$ZOUT \text{ (at node 238)} = ((R_1+R_2)/R_1) \cdot R_{TERM} \quad \text{equation (2)}$$

By utilizing amplifier 208 to drive transistor 210, amplifier 208 effectively increases the transconductance ($g_m$) of transistor 210, which helps to insure that the condition in equation (1) is satisfied. By insuring that the condition in equation (1) is satisfied, ZOUT at node 238 (indicated by arrow 244) is less dependent on the value of $g_m$ and more dependent on resistance $R_{TERM}$, which is desirable since the properties of transistor 210 are more dependent on variations in process, voltage, and temperature than the resistance (i.e. $R_{TERM}$) of degeneration resistor 216. Thus, ZOUT at node 238 has a reduced variation dependency on process, temperature, and voltage, which causes an output signal at output terminal 236 to have increased linearity. Since branch 204 is substantially identical to branch 202, ZOUT at node 242 (indicated by arrow 246) is also represented by equation (2). Since active termination circuit 200 operates in a differential mode (i.e. it has differential outputs at output terminals 236 and 240), ZOUT across nodes 238 and 242 can be represented by the equation:

$$ZOUT \text{ (across nodes 238 and 242)} = 2.0 \cdot ((R_1+R_2)/R_1) \cdot R_{TERM} \quad \text{equation (3)}$$

In an Ethernet application, for example, ZOUT at each of nodes 238 and 242 can be equal to approximately 50.0 ohms and ZOUT across nodes 238 and 242 (i.e. across differential outputs at output terminals 236 and 240) can be equal to approximately 100.0 ohms. The values of ZOUT at nodes 238 and 242 can be adjusted (i.e. trimmed) by appropriately adjusting respective feedback resistors 212 and 222, which enables active termination circuit 200 to be programmed. In one embodiment, the values of feedback resistors 212 and 222 can be predetermined prior to fabrication of active termination circuit 200 on a die.

By providing amplifiers 208 and 218 to drive the respective gates of transistors 210 and 220, providing feedback resistors 212, 214, 222, and 224, and providing degeneration resistors 216 and 226 coupled in series with transistors 210 and 220, an embodiment of the invention's active termination circuit 200 can provide an active termination output at nodes 238 and 242 in a differential current-mode line driver. Active termination circuit 200 can provide, for example, an output impedance between nodes 238 and 242 equal to approximately 100.0 ohms in a differential operating mode without requiring a shunt resistance between nodes 238 and 242, thereby significantly reducing current consumption. In contrast, in conventional line driver 102, termination resistors 114 and 116, which are coupled between nodes 142 and 144, effectively provide a shunt resistance that consumes current that would otherwise be utilized to drive transmission line 172, which is coupled to differential outputs VP OUT 138 and VN OUT 140 via transformer 108.

Thus, an embodiment of the invention in FIG. 2 provides a differential active termination circuit that provides active termination outputs while consuming significantly less power than the passive termination provided by termination resistors 114 and 116 in conventional line driver 102 in FIG. 1. By reducing on-chip current consumption, transistors 210 and 220 can be smaller in size, which advantageously reduces the die area consumed by active termination circuit 200, thereby advantageously reducing manufacturing cost. Also, by eliminating on-chip termination resistors, an embodiment of the invention's active termination circuit eliminates the heat generated by the on-chip termination resistors, thereby advantageously eliminating the need for more expensive packaging that could be required to handle the additional heat generated by the termination resistors. Also, since feedback resistors 212 and 222 are adjustable, the output impedance across nodes 238 and 242 can be advantageously trimmed by appropriately adjusting feedback resistors 212 and 222.

Figure 3:
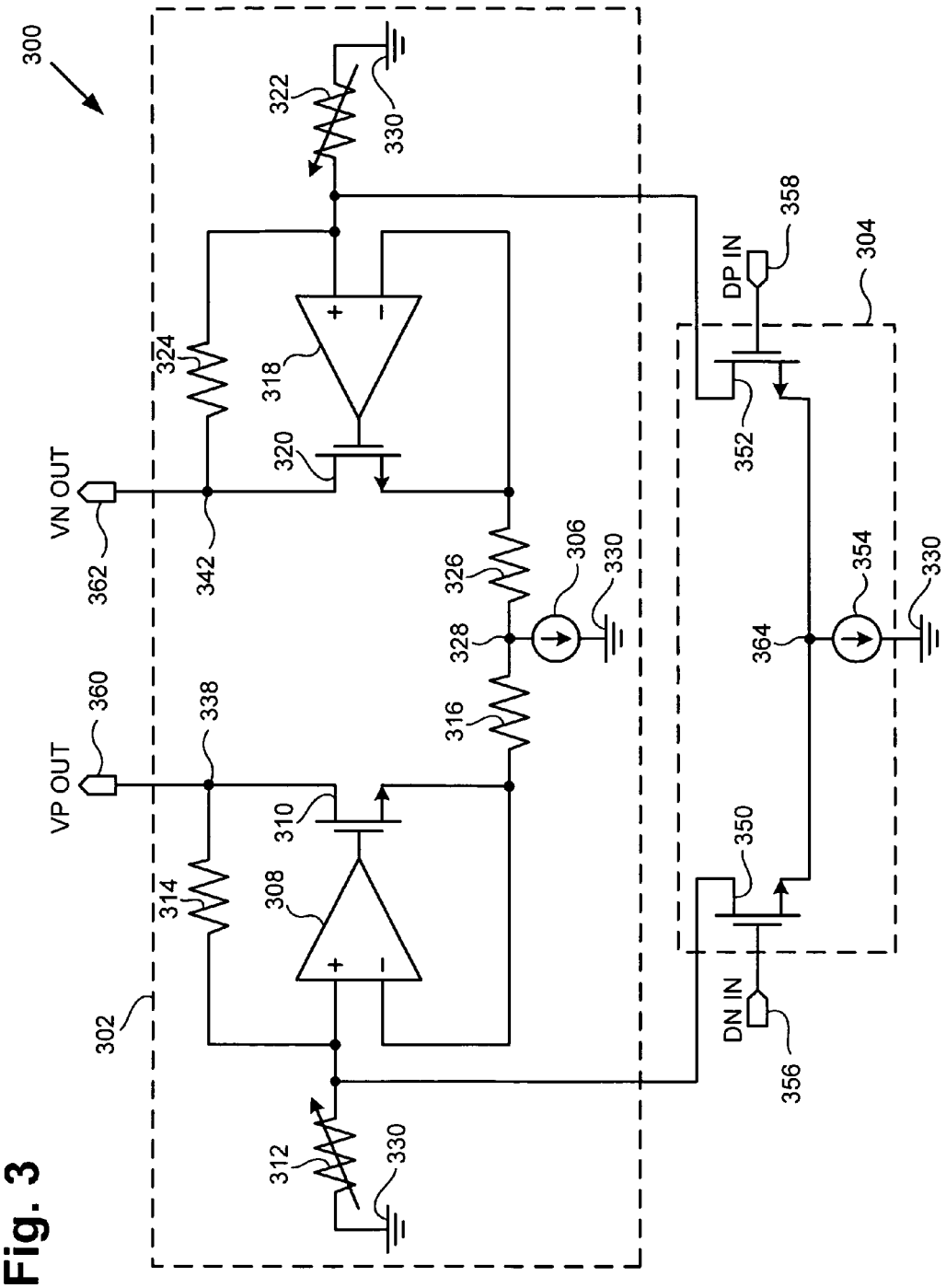
FIG. 3 illustrates a circuit diagram of an exemplary line driver in accordance with one embodiment of the present invention.

FIG. 3 shows a circuit diagram of an exemplary line driver in accordance with one embodiment of the present invention. Line driver 300 includes active termination circuit 302 and current digital-to-analog converter (DAC) 304. Active termination circuit 302, which is a differential active termination circuit, corresponds to active termination circuit 200 in FIG. 2. In particular, tail current sink 306, amplifiers 308 and 318, transistors 310 and 320, feedback resistors 312, 314, 322, and 324, degeneration resistors 316 and 326, nodes 328, 338, and 342, and ground 330 in active termination circuit 302 correspond, respectively, to tail current sink 206, amplifiers 208 and 218, transistors 210 and 220, feedback resistors 212, 214, 222, and 224, degeneration resistors 216 and 226, nodes 228, 238, and 242, and ground 230 in active termination circuit 200 in FIG. 2. Current DAC 304 includes transistors 350 and 352 and tail current sink 354. Line driver 300 can be a current-based line driver, such as a current-based Ethernet line driver. Line driver 300 can be utilized, for example, in set-top boxes, cable modems, routers, computers, and other electronic devices to drive data on transmission lines, such an Ethernet cables. For example, line driver 300 can be utilized in any IC chip with an Ethernet interface, which can be coupled to an Ethernet transmission line, such as a CAT 5 Ethernet cable or other type of Ethernet cable.

Line driver 300 can be configured to receive data negative input (DN IN) 356 and data positive input (DP IN) 358 and to provide voltage positive output (VP OUT) 360 and voltage negative output (VN OUT) 362, where VP OUT 360 and VN OUT 362 are differential outputs and DN IN 356 is the complement of DP IN 358. Thus, if DP IN 358 provides a digital value of "1," DN IN 356 will provide a digital value of "0," and vice versa. Also, data can be inputted into line driver 300 as a multi-bit digital word and its complement, where each bit requires a separate current DAC, such as current DAC 304. Thus, for example, in an embodiment in which a digital word comprising 16 bits is inputted into line driver 300, 16 current DACs, such as current DAC 304, would be coupled to active termination circuit 302, where each current DAC would correspond to one bit of the digital word. In the above example, each current DAC would drive active termination circuit 302 concurrently and the current outputs provided by the current DACs would be summed together.

As shown in FIG. 3, a first terminal of tail current sink 354 is coupled to ground 330 and a second terminal of tail current sink 354 is coupled to the sources of transistors 350 and 352 at node 364. Transistors 350 and 352 can each be an NFET, for example. Also shown in FIG. 3, DN IN 356 is coupled to the gate of transistor 350 and the drain of transistor 350 is coupled to the positive (non-inverting) input of amplifier 308. Further shown in FIG. 3, DP IN 358 is coupled to the gate of transistor 352 and the drain of transistor 352 is coupled to the positive (non-inverting) input of amplifier 318. Thus, the current outputs provided by current DAC 304 are coupled to the respective positive inputs of amplifiers 308 and 318 of active termination circuit 302. Current ($I_{DAC}$) 366, which is the current sunk by current DAC 304, determines the amplitude of the current outputs provided to active termination circuit 302 by current DAC 304.

Line driver 300 can provide an active termination output at nodes 338 and 342, where the output impedance between nodes 338 and 342 can be determined by equation (3). In an Ethernet application, for example, line driver 300 can provide an active termination output of approximately 100.0 ohms across nodes 338 and 342, i.e., across differential outputs VP OUT 360 and VN OUT 362. By including active termination circuit 302, line driver 300 provides similar advantages as previously discussed with respect to active termination circuit 200 in FIG. 2, such as reduced on-chip current consumption and reduced area consumed on the die. As apparent from the above description, the embodiments of the invention in FIGS. 2 and 3 can be generally utilized in a transmitter while the transmitter is in a transmit mode.

Figure 4:
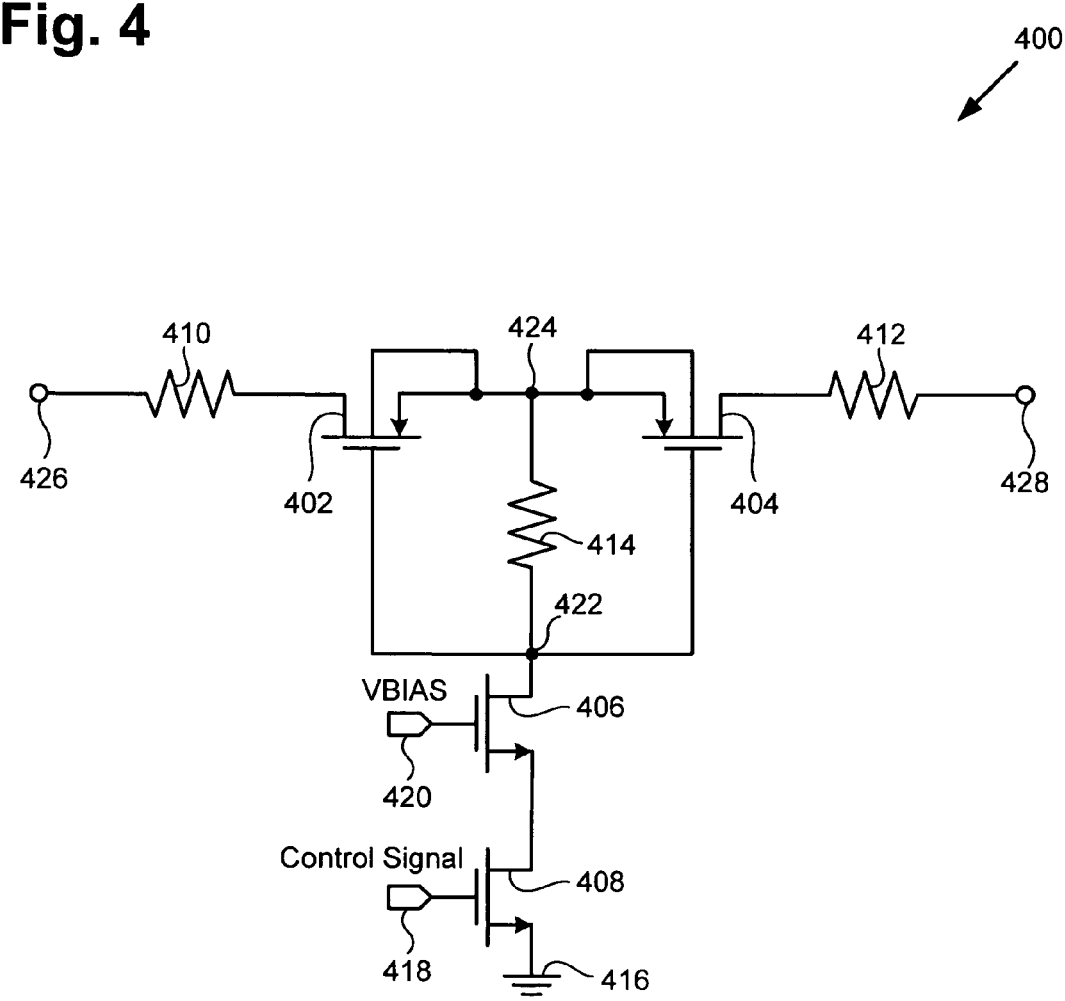
FIG. 4 illustrates a circuit diagram of an exemplary switchable passive termination circuit in accordance with one embodiment of the present invention.

FIG. 4 shows a circuit diagram of an exemplary switchable passive termination circuit in accordance with one embodiment of the present invention. Switchable passive termination circuit 400 (also referred to simply as "passive termination circuit 400") includes transistors 402, 404, 406, and 408, termination resistors 410 and 412, and resistor 414. Passive termination circuit 400 can be utilized, for example, to provide switchable passive termination for a transmitter module, which can include a line driver, such as line driver 300 in FIG. 3, coupled to a transmission line, such as an Ethernet cable. When the transmitter module is transmitting data over the transmission line, the transmitter module can utilize an embodiment of the invention's active termination circuit (e.g. active termination circuit 200 in FIG. 2) to provide differential active termination and the passive termination provided by passive termination circuit 400 can be switched off. When the transmitter module is not transmitting data over the transmission line, passive termination can be switched on across the differential outputs of the transmitter module by passive termination circuit 400.

As shown in FIG. 4, the source of transistor 408 is coupled to ground 416, control signal 418 is coupled to the gate of transistor 408, and the drain of transistor 408 is coupled to the source of transistor 406. Transistor 408, which can be, for example, an NFET, can be configured as a switch that can be turned on or off in response to control signal 418, which can be a digital signal. For example, control signal 418 can provide a digital value of "1" to turn on transistor 408, where the digital value of "1" can be represented by VDD, and can provide a digital value of "0" to turn off transistor 408, where the digital value of "0" can be represented by 0.0 volts (e.g. ground potential) in one embodiment.

Also shown in FIG. 4, bias voltage (VBIAS) 420 is coupled to the gate of transistor 406 and the drain of transistor 406 is coupled to the gates of transistors 402 and 404 and a first terminal of resistor 414 at node 422. Transistor 406 can function as a voltage protect transistor and can be, for example, an NFET. VBIAS 420 can provide a bias voltage equal to, for example, VDD to the gate of transistor 406. Resistor 414 can have a resistance equal to, for example, approximately 25.0 kilo-ohms in one embodiment. Each of transistors 402 and 404 can be a P-channel FET (PFET), for example. Each of transistors 402 and 404 can be, for example, a very large transistor having a low on-resistance such that the transistor has a very small source-to-drain voltage when turned on.

Further shown in FIG. 4, a second terminal of resistor 414 is coupled to a source and a bulk terminal of transistor 402 and a source and a bulk terminal of transistor 404 at node 424. Also shown in FIG. 4, a drain of transistor 402 is coupled to a first terminal of termination resistor 410 and a second terminal of termination resistor 410 is coupled to terminal 426 of passive termination circuit 400. Termination resistor 410 can have a resistance equal to, for example, approximately 50.0 ohms in one embodiment. Further shown in FIG. 4, a drain of transistor 404 is coupled to a first terminal of termination resistor 412 and a second terminal of termination resistor 412 is coupled to terminal 428 of switchable passive termination circuit 400. Termination resistor 412 can have a resistance equal to, for example, approximately 50.0 ohms in one embodiment.

Passive termination circuit 400 can be coupled across differential outputs of a transmitter module, such as an open-drain transmitter module, where the outputs of the transmitter module can be coupled across a transmission line, such as an Ethernet cable. The transmitter module can be situated in an electronic device that also includes a receiver module, where the electronic device can be, for example, a set-top box, a cable modem, a router, a computer interface, or other type of communications device. For example, the electronic device can include an Ethernet interface coupled to an Ethernet transmission line, which can be driven by the transmitter module. In one embodiment, the transmitter module can include a line driver, such as line driver 300 in FIG. 3. Passive termination circuit 400 can be configured to operate in a transmit mode when the transmitter module is transmitting data over the transmission line, such as an Ethernet transmission line, and to operate in a receive mode when the transmitter module is not transmitting data over the transmission line.

A more detailed operation of passive termination circuit 400 in the receive and transmit modes will now be discussed. To illustrate the operation of passive termination circuit 400, terminals 426 and 428 can each have a voltage that swings above and below VDD, which can be approximately 2.5 volts. Thus, in the following discussion, terminal 426 can swing between 1.25 volts and 3.75 volts and terminal 428 can swing between 3.75 volts and 1.25 volts, for example. In the receive mode, control signal 418 can apply a sufficiently high voltage level, such a VDD, to the gate of transistor 408 to turn it (i.e. transistor 408) on and VBIAS 420, which can be, for example approximately equal to VDD, can turn on transistor 406. When transistors 406 and 408 are turned on, the gates of transistors 402 and 404 are pulled to ground, which can be, for example, at approximately 0.0 volts. Since resistor 414 has a high resistance, it only draws a minimal amount of current. As a result, node 424 can have a voltage equal to approximately 2.5 volts (i.e. VDD in the present example). When the gates of transistors 402 and 404 are pulled to ground, transistors 402 and 404 are turned on (i.e. conducting), thereby providing a very low impedance path between termination resistors 410 and 412. As a result, termination resistors 410 and 412 are electrically coupled between terminals 426 and 428.

In the receive mode, all transistors in passive termination circuit 400 are required to operate in a "safe" region, where "safe" is defined so as to eliminate transistor breakdown. In the present example, in which VDD is equal to approximately 2.5 volts, "safe" is defined to require the gate-to-drain voltage, gate-to-source voltage, source-to-drain voltage, and gate-to-bulk voltage of each transistor in passive termination circuit 400 to be less than 2.5 volts.

In the transmit mode, control signal 418 can apply a sufficiently low voltage level, such as 0.0 volts, to the gate of transistor 408 to turn it off and VBIAS 420 can apply a sufficient high voltage level to the gate of transistor 406 to turn it on. By turning off transistor 408, current is prevented from flowing to ground 416. As a result, resistor 414 can pull up node 422 to the substantially the same voltage as node 424. Since transistors 402 and 404 are PFETs, the gate-to-source voltage of transistor 402 and transistor 404 is equal to approximately 0.0 volts. As a result, one of transistors 402 and 404 will be turned off, thereby providing a high impedance path between termination resistors 410 and 412 and, consequently, between terminals 426 and 428 of passive termination circuit 400. For example, the transistor coupled to the terminal of passive termination circuit 400 having a low voltage swing will be turned off and the transistor coupled to the terminal of passive termination circuit 400 having a high voltage swing will be conducting. As a result, termination resistor 410 will be electrically decoupled from termination resistor 412 and a high impedance will be provided between terminals 426 and 428 of passive termination circuit 400.

In the transmit mode, all transistors in passive termination circuit 400 are also required to operate in the "safe" region, as previously defined. In the present example node 424 can be as high as 3.75 volts, since it (i.e. node 424) follows the highest voltage provided at terminals 426 and 428 of passive termination circuit 400. Since node 422 follows node 424, it (i.e. node 422) can be as high as 3.75 volts in the present example. Thus, if transistor 406 was not utilized and the drain of transistor 408 was directly coupled to node 422, the drain of transistor 408 would see 3.75 volts, which would have a degrading effect on transistor 408. However, transistor 406 protects transistor 408 by preventing the drain of transistor 408 from rising above 2.5 volts.

Thus, in the embodiment in FIG. 4, passive termination circuit 400 can be configured to operate in a transmit mode and a receive mode and can be coupled across differential outputs of a transmitter module, which can be coupled across a transmission line, such as an Ethernet transmission line. In the transmit mode, passive termination circuit 400 can provide a high impedance between terminals 426 and 428 by electrically decoupling termination resistors 410 and 412, and in the receive mode, passive termination circuit 400 can provide passive termination between terminals 426 and 428 by electrically coupling termination resistors 410 and 412 between terminals 426 and 428. Thus, passive termination circuit 400 advantageously reduces on-chip current consumption by preventing current from flowing through termination resistors 410 and 412 in the transmit mode.

Thus, as discussed above, in an embodiment in FIG. 2, the invention provides an active termination circuit, such as a differential active termination circuit, for providing active termination across the outputs of a line driver, such as an open-drain Ethernet line driver, where the active termination circuit advantageously reduces on-chip current consumption. As a result, an embodiment of the invention's active termination circuit can utilize smaller size transistors, which can advantageously reduce the die area consumed by the active termination circuit, thereby reducing manufacturing cost. In an embodiment in FIG. 3, the invention provides a line driver, such as an open-drain Ethernet line driver, that advantageously utilizes the invention's active termination circuit. As apparent from the above description, the embodiments of the invention in FIGS. 2 and 3 can be generally utilized in a transmitter while the transmitter is in a transmit mode.

In an embodiment in FIG. 4, the invention provides a switchable passive termination circuit that is configured to operate in a receive mode and a transmit mode. In the receive mode, an embodiment of the invention's switchable passive termination circuit can provide passive termination across differential outputs of a transmitter module when the transmitter module is not transmitting data across a transmission line, such as an Ethernet transmission line. In the transmit mode, the embodiment of the invention's switchable passive termination circuit can provide a high impedance across the differential outputs of the transmitter module when the transmitter module is transmitting data across the transmission line. Thus, the invention's switchable passive termination circuit advantageously reduces on-chip current by preventing current from flowing through the passive termination in the transmit mode.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

The invention claimed is:

1. An active termination circuit comprising at least one active termination branch and an active termination output, said at least one active termination branch comprising:
    at least one transistor for providing said active termination output, a source of said at least one transistor being coupled to a degeneration resistor;
    an amplifier driving said at least one transistor, said amplifier having a non-inverting input coupled to said active termination output via a feedback network, said amplifier controlling a current flowing through said at least one transistor to provide said active termination output;
    wherein an inverting input of said amplifier is coupled to said source of said at least one transistor.

2. The active termination circuit of claim 1, wherein said active termination output is provided at a drain of said at least one transistor.

3. The active termination circuit of claim 1, wherein said source of said at least one transistor is coupled to ground through said degeneration resistor and a tail current sink.

4. The active termination circuit of claim 1, wherein said feedback network comprises a first feedback resistor coupled between said non-inverting input of said amplifier and ground.

5. The active termination circuit of claim 4, wherein said feedback network further comprises a second feedback resistor coupled between said non-inverting input of said amplifier and said active termination output.

6. The active termination circuit of claim 4, wherein said first feedback resistor is adjustable for trimming an output impedance at said active termination output.

7. A line driver comprising:
    an active termination circuit including two active termination branches, each of said active termination branches comprising:
        at least one transistor for providing an active termination output;
        an amplifier driving said at least one transistor, said amplifier having a non-inverting input coupled to said active termination output via a feedback network;
        said amplifier controlling a current flowing through said at least one transistor so as to provide said active termination output;

wherein said feedback network comprises a first feedback resistor coupled between said non-inverting input of said amplifier and ground.

8. The line driver of clam 7 further comprising at least one current DAC coupled to said active termination circuit, wherein said at least one current DAC has a data negative input and a data positive input.

9. The line driver of claim 7, wherein said active termination output is provided by a drain of said at least one transistor, and wherein a source of said at least one transistor is coupled to ground through a degeneration resistor.

10. The line driver of clam 7, wherein said active termination circuit further comprises a tail current sink coupled between said two active termination branches and ground.

11. The line driver of claim 7, wherein said feedback network further comprises a second feedback resistor coupled between said non-inverting input of said amplifier and said active termination output.

12. The line driver of claim 11, wherein said first feedback resistor is adjustable for trimming an output impedance at said active termination output.

13. The line driver of claim 9, wherein an inverting input of said amplifier is coupled to said source of said at least one transistor.

14. An active termination circuit comprising at least one active termination branch and an active termination output, said at least one active termination branch comprising:

at least one transistor for providing said active termination output, a terminal of said at least one transistor being coupled to a current sink;

an amplifier driving said at least one transistor, said active termination output driving said amplifier to control a current flowing through said at least one transistor to provide said active termination output;

wherein an inverting input of said amplifier is coupled to a source of said at least one transistor.

15. The active termination circuit of claim 14, wherein said active termination output is provided at a drain of said at least one transistor.

16. The active termination circuit of claim 14, wherein said active termination output drives a non-inverting input of said amplifier through a feedback network.

17. The active termination circuit of claim 16, wherein said feedback network comprises a feedback resistor coupled between said active termination output and said non-inverting input of said amplifier.

18. The active termination circuit of claim 16, wherein said feedback network comprises a feedback resistor coupled between ground and said non-inverting input of said amplifier.

* * * * *